United States Patent [19]

Janson et al.

[11] 4,380,063

[45] Apr. 12, 1983

[54] FLOW CONTROL MECHANISM FOR BLOCK SWITCHING NODES

[75] Inventors: Philippe A. Janson, Wädenswil; Hans R. Müller, Langnau; Ernst H. Rothauser, Reichenburg, all of Switzerland

[73] Assignee: International Business Machines Corp., Armonk, N.Y.

[21] Appl. No.: 272,143

[22] Filed: Jun. 10, 1981

[30] Foreign Application Priority Data

Jun. 19, 1980 [EP] European Pat. Off. ...... 80/103407.5

[51] Int. Cl.³ .......................... H04J 3/00; G06F 15/16
[52] U.S. Cl. ................................................ 370/60
[58] Field of Search ...................... 370/60, 94, 92, 79, 370/100, 108; 364/200 MS File, 900 MS File; 179/18 EA; 178/2 R, 3

[56] References Cited

U.S. PATENT DOCUMENTS 4,032,899 6/1977 Jenny et al. ......................... 364/200

FOREIGN PATENT DOCUMENTS 2525414 5/1976 Fed. Rep. of Germany .

OTHER PUBLICATIONS

Bocker: "Möglichkeiten und Grenzen von Paketvermittlungsnetzen", *Telcom Report* 1 (1978) Heft 2, pp. 110–117.

Filipowsky et al.: "Digital Data Transmission Systems of the Future", *IRE Trans. on Comm. Syst.*, vol. CS-9, Mar. 1961, pp. 88–96.

Manual: "IBM Synchronous Data Link Control" (Form No. GA27-3093, General Information, Undated).

Reiser et al.: "Queueing Network Models: Methods of Solution and their Program Implementation", Chapter 4 of Current Trends in Programming Methodology, vol. III: Software Modeling, Prentice-Hall, 1978.

*Primary Examiner*—Thomas A. Robinson
*Attorney, Agent, or Firm*—John B. Frisone

[57] ABSTRACT

In a communication network comprising block switching nodes interconnected by transmission links, a flow control mechanism is provided in each switching node for regulating the flow of addressed data blocks or messages. A hardware look-ahead mechanism effective within each node tests for each data block received from a link and buffered at an input port, whether it can be accepted at the appropriate output port of the same node for further transmission. A token mechanism effective over links permits maintenance at each output port of a node of an indication whether any data block can be accepted in the input port at the other end of the respective link. By the combined operation of look-ahead mechanisms and token mechanisms the flow of addressed messages in a direction where the transmission path is already filled up is prevented. This has a positive smoothing effect on overall traffic flow where short-time or local overloads occur.

8 Claims, 16 Drawing Figures

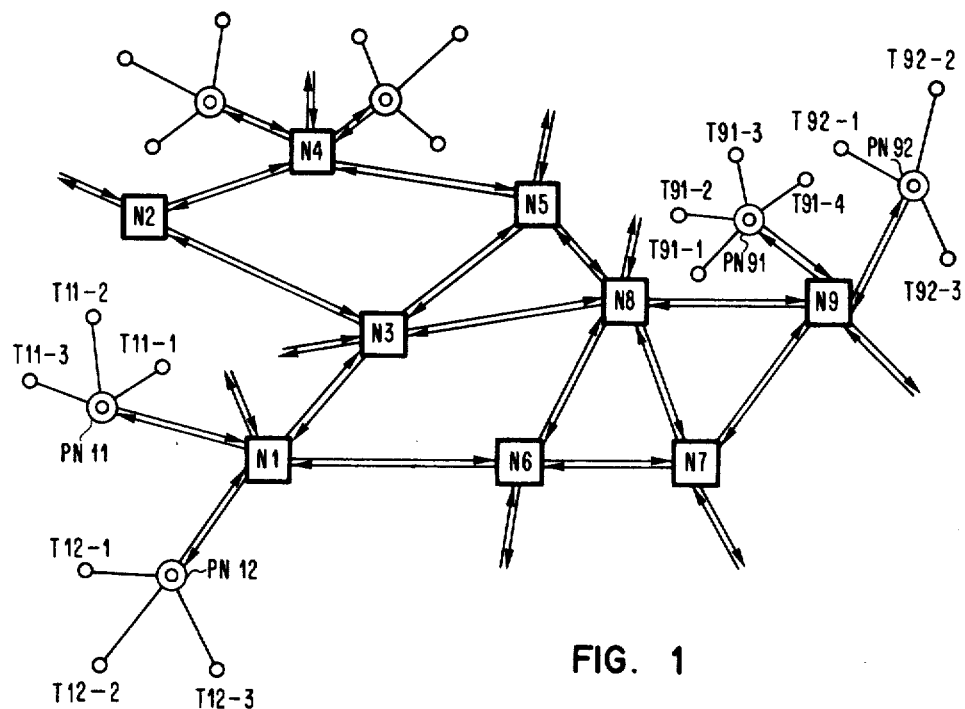
FIG. 1
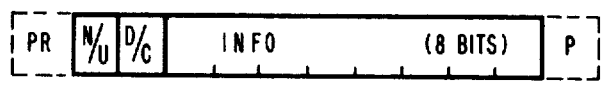
FIG. 2  BYTE STRUCTURE
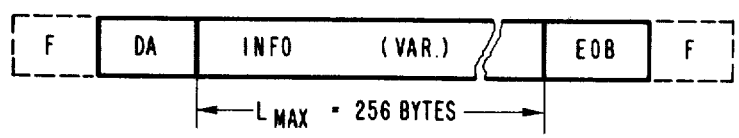
FIG. 3  FRAME STRUCTURE

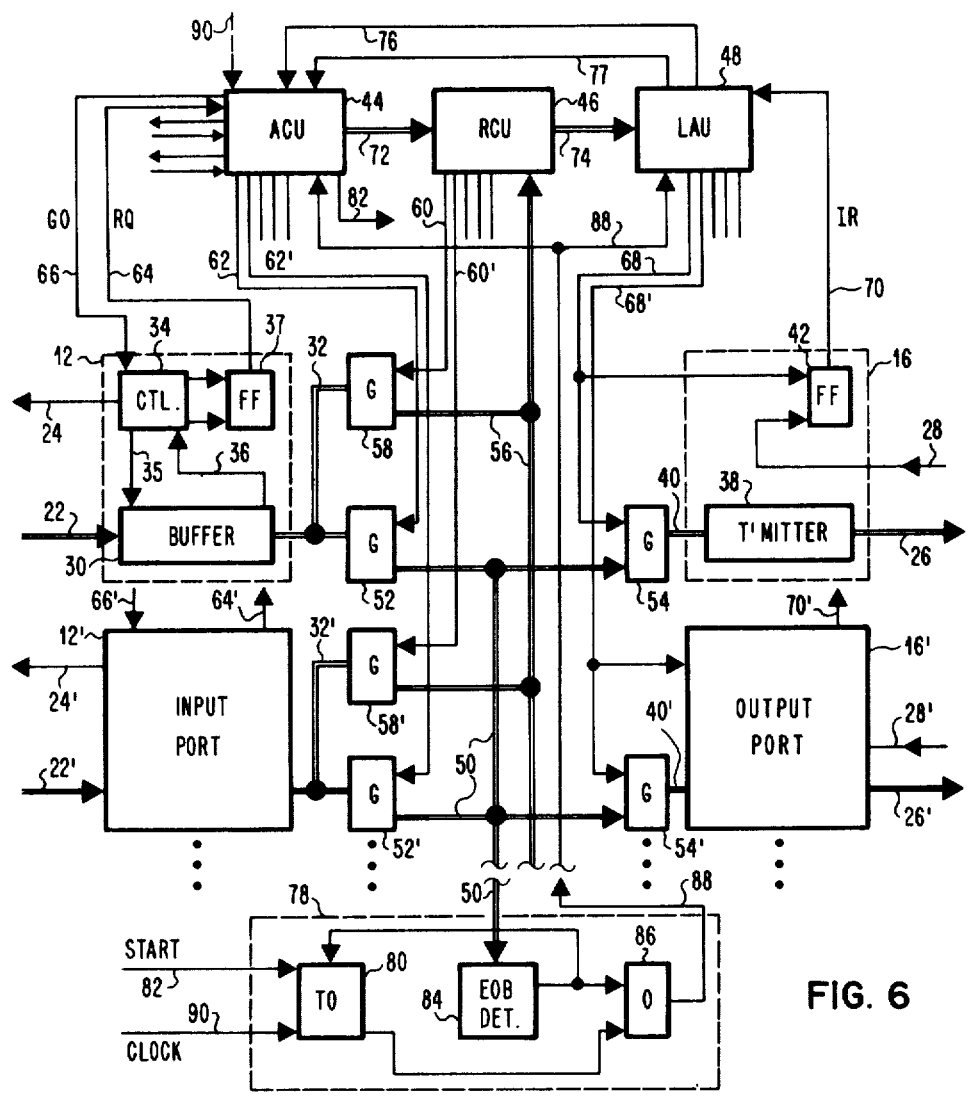
FIG. 6
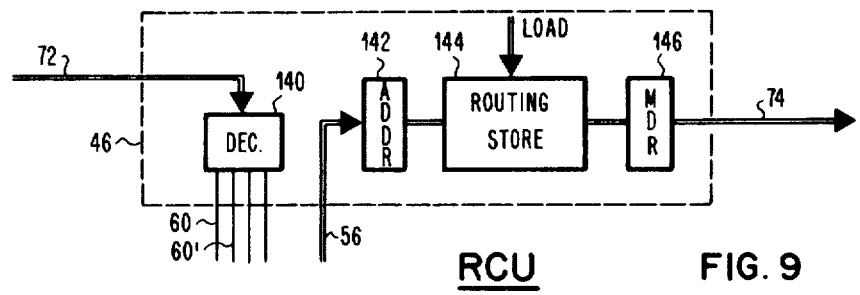
RCU  FIG. 9

ACU

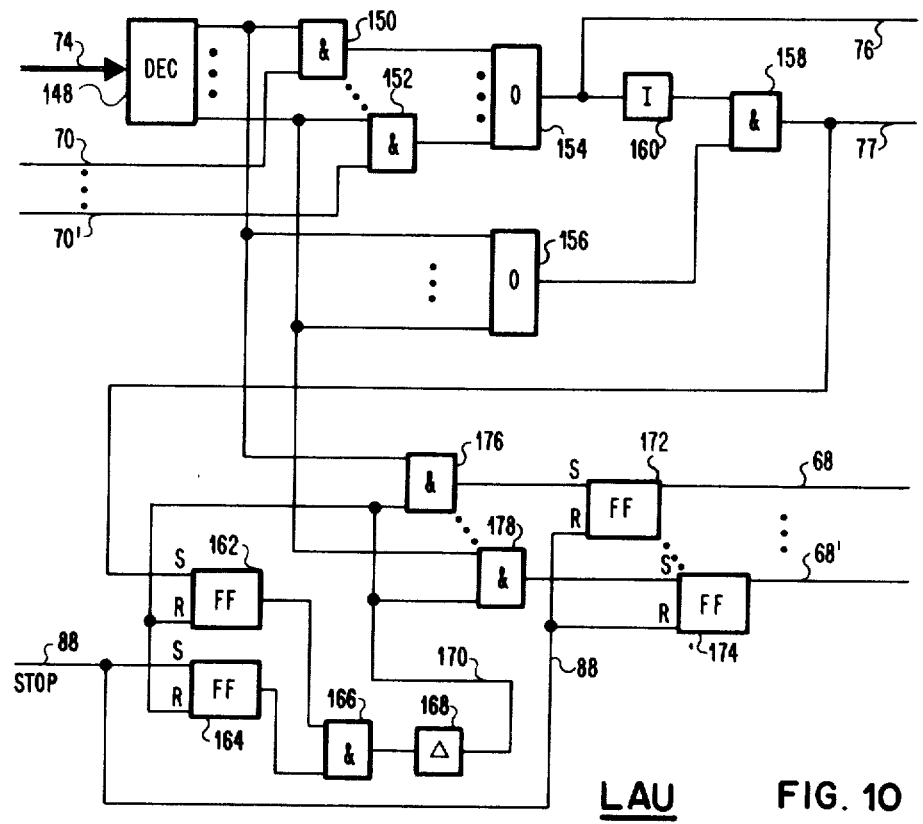
FIG. 10  LAU
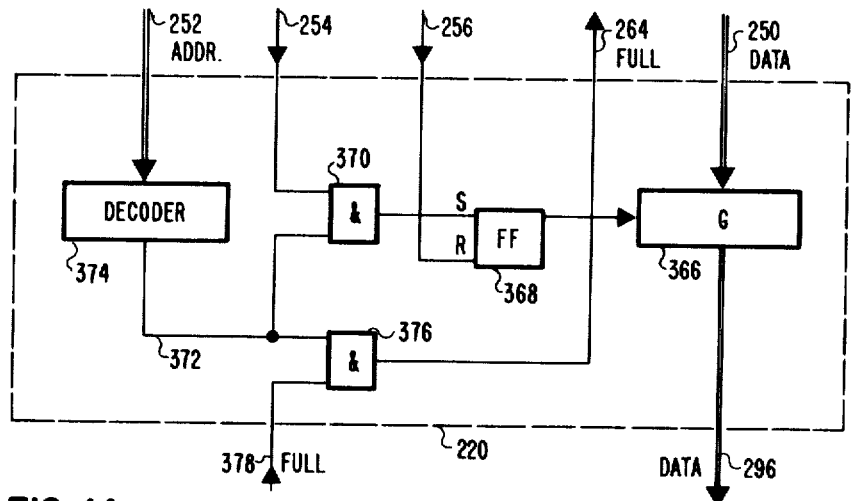
FIG. 14  OAC

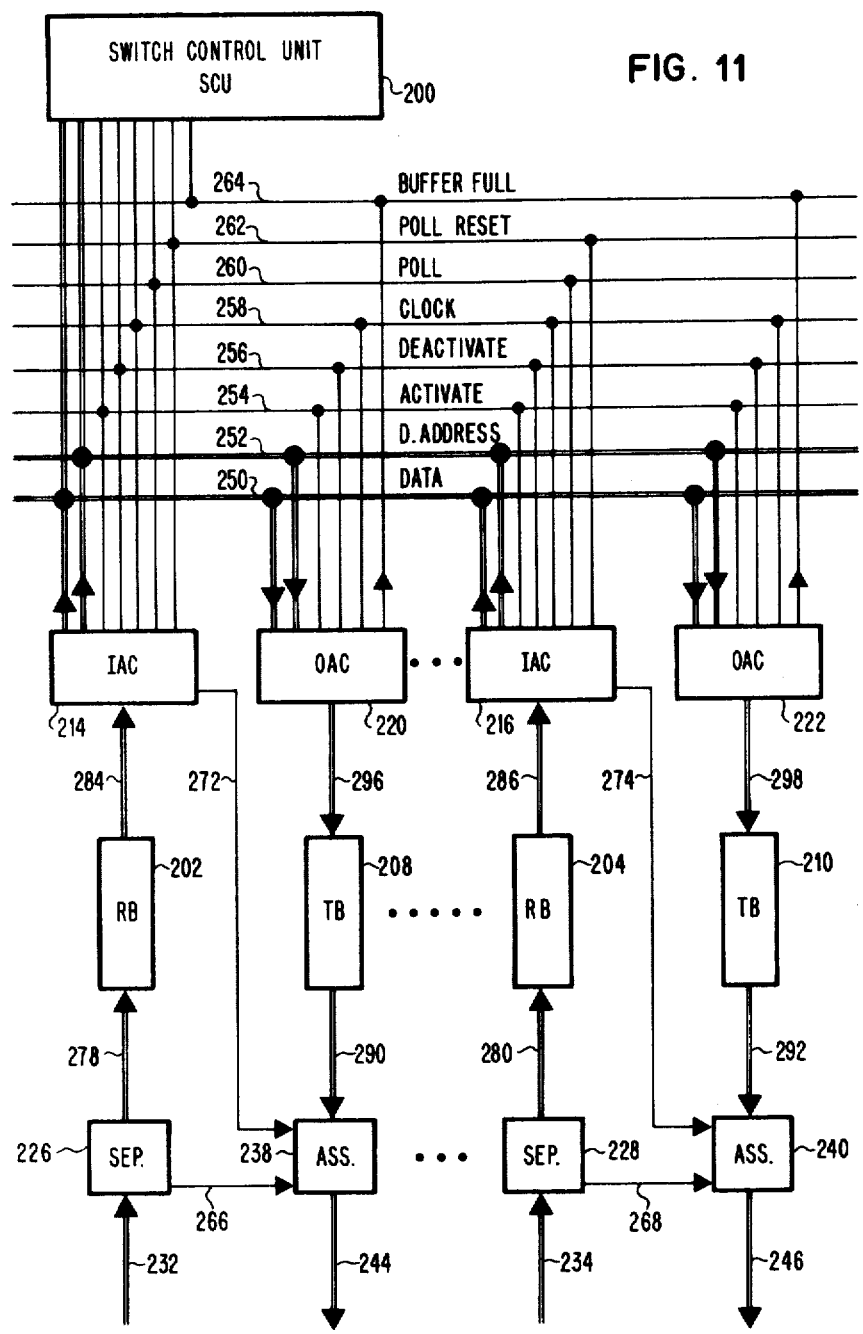

SCU

IAC

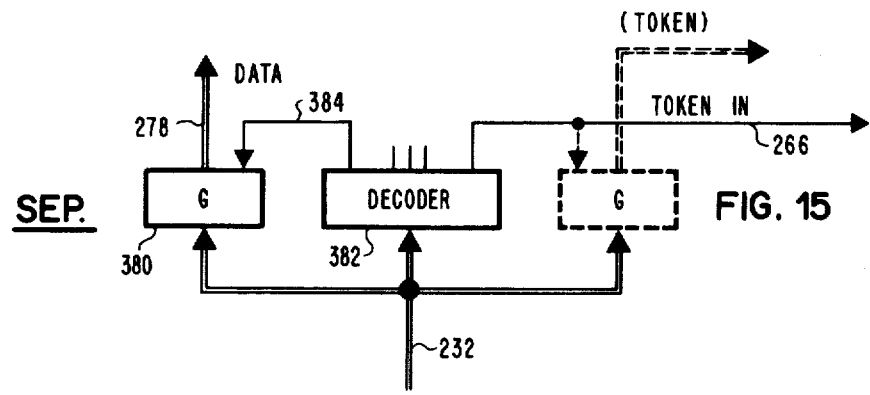
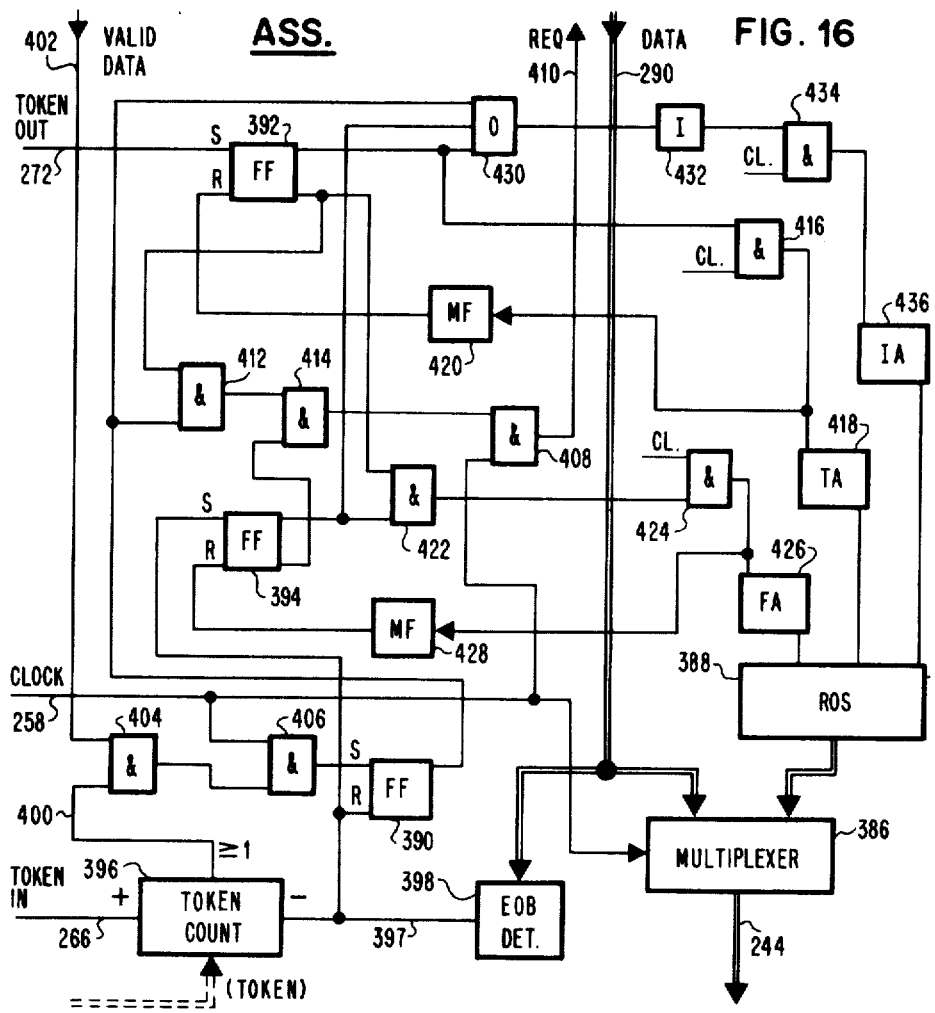

FLOW CONTROL MECHANISM FOR BLOCK SWITCHING NODES

The present invention is concerned with switching nodes for block switching of data in local communication networks, and particularly with flow control in and between such switching nodes. The term "block switching" is intended to mean the switching of complete addressed data blocks or messages which are buffered in each node, in contrast to circuit switching where a complete path is available for data transfers, and to packet switching where messages are subdivided into packets for transmission and where retransmission between adjacent nodes is possible.

Traditionally, bus or loop arrangements were provided for communications in a local environment. The present invention is concerned with a star topology or meshed local network. Star or meshed topologies present advantages over others with respect to expandibility of network capacity, upgradability of selected components to newer technologies, and reliability.

If, in a communications network interconnecting a great number of stations, unlimited transmission capacity on links and unlimited buffering capacity in switching nodes were available, no flow control and congestion problems would arise except in case of failures, provided that each terminal station accepts all messages furnished to it. As, however, either transmission or buffering resources—or even both—are limited, a technique for controlling the flow of information must be introduced.

One possibility is to provide central flow control by one supervisory unit. This requires, however, a powerful flow control unit, introduces the danger of system breakdown when the single central control mechanism fails, and further requires the transmission of much overhead information—i.e., the flow control data—through the whole system.

Another possibility is to provide some more distributed flow control, e.g., between neighboring nodes or functional units, to regulate the data flow at least within limited regions. This requires exchange of flow information only on a regional basis, and avoids dependency on a single mechanism, though it may not be possible to achieve an overall system flow optimization by such a method.

In an article, "Queueing network models: Methods of solution and their program implementation," by M. Reiser et al (Chapter 4 in "Current trends in programming methodology, Vol. III: Software Modeling," Prentice-Hall 1978), token mechanisms were described for regulating allocation of resources to jobs in a computer or communication system. These mechanisms are intended for implementation by program, and no switching function depending on routing or address information is involved.

The manual, "IBM Synchronous Data Link Control/General Information," (Form No. GA 27-3093) mentions the "Ready to Receive" supervisory frames which are used in SDLC as tokens sent over a link to a sender for indicating the availability of a receiver to accept a message. Such a mechanism is also not involved directly with any switching function in stations or nodes.

From some switching systems it is known to store messages in a store of a switch node, post a pointer for each message in an appropriate queue, and read the message for forwarding when the pointer in the queue is selected. An example for such a system is given in U.S. Pat. No. 4,032,899. However, in these systems the dispatching is handled by software, message storing and readout requires addressing a common store, and while the availability of receiving buffer space in the next node may be considered, it is not involved in the forwarding of a message inside a node.

An article by R. J. Filipowski et al, "Digital Data Transmission Systems of the Future," published in IRE Transactions on Communication Systems, Vol. CS-9, March 1961, discussed communication facilities in which the flow of data through given channels is controlled to optimally utilize links for transmitting traffic from a number of sources. This teaches an efficient way of multiplexing the data stream over a group of links, but does not involve the switching of addressed data blocks or messages in each node. For a whole network, the use of software in each node and network-wide exchange of routing messages is considered, which increases the overhead as mentioned above.

All these prior art systems either need much programming and processing overhead for queue administration, list linking, virtual circuit management, etc. and require random access storage accessing and buffer management which inherently sets a limit to the achievable speed of a switch, or they only enable flow control over individual sections of a network such as a single link, with the flow control terminating in each node, i.e., no coupling being provided over several links and nodes.

It is an object of the invention to devise a mechanism for flow control in a network including switching nodes, that provides an improvement in systems performance without increasing software overhead, but rather with a limited extension of hardware circuitry. It is a further object to define flow control arrangements in switching nodes to enable a high throughput of data blocks. It is a further object to create a system that permits operation with a minimum of buffer capacity in the switching nodes due to high throughput and prevention of data flowing in a direction or into a region where they currently cannot be quickly dispatched.

The invention provides an efficient combination of a token mechanism that is effective over each link, i.e., between adjacent node pairs, with a hardware look-ahead mechanism that is effective between receiving and sending ends of different links within each individual node. It provides the following advantages: high throughput rates in node switches due to hardware-oriented solution and minimum processing overhead due to avoidance of buffer management, etc. Messages that cannot readily be forwarded are delayed along their path through the network, and when the path is filled, the source is prevented from sending more messages. Problems of storage management are thereby prevented. Swamping of a node by several sources, i.e., statistical congestion, is avoided as well as swamping by a single station transmitting too fast, i.e., directed congestion.

The invention particularly has a smoothing effect in situations where short time traffic peaks occur, i.e., in a network with switching nodes sufficient for an average traffic rate, congestion due to local and short time peak situations is avoided without the necessity for complicated software and processing overhead.

The assumption is made that in a system employing the invention, stations exchanging data operate on a peer-to-peer basis, i.e., no station sends on average more data than its partner station can accept.

General principles of the inventive concept, and two embodiments of the invention will be described in the following in connection with the drawings.

In the drawings:

FIG. 1 is an overview of a communication network including block switching nodes in which the invention finds application;

FIG. 2 is a graphic illustration of the byte structure of transmitted data;

FIG. 3 is a graphic illustration of the block structure for transmitting data blocks;

FIG. 6 is a block diagram of a first block switch embodying the invention;

FIGS. 7-10 illustrate the details of several functional units of the first block switch, namely the control unit of an input port, the access control unit, the routing control unit, and the look-ahead unit;

FIG. 11 is a block diagram of a second block switch embodying the invention; and FIGS. 12-16 illustrate the details of several functional units of the second block switch, namely the switch control unit, an input access control unit, an output access control unit, a separator, and an assembler/token handler.

(A) GENERAL FACTS ABOUT SYSTEM, DATA STRUCTURE AND INVENTIVE CONCEPT

Figure 4:
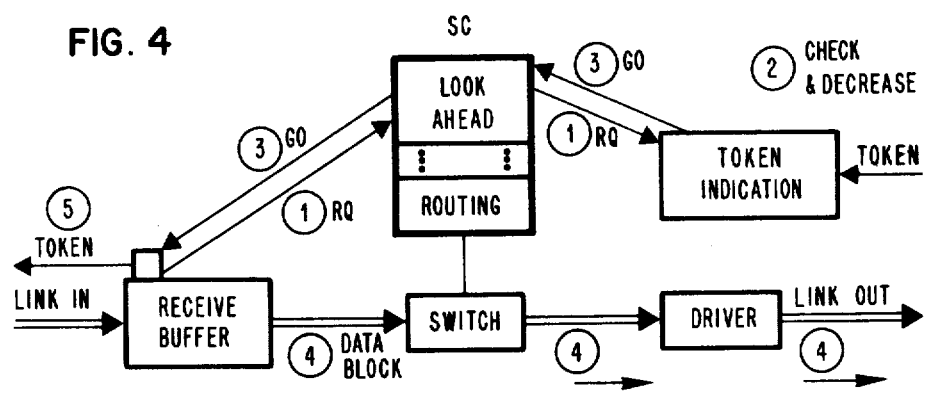
FIG. 4 is a block diagram illustrating a first form of the inventive principle combining block switch look-ahead and token exchange over links.

Network Survey and Function of Block Switch

FIG. 1 is a schematic overview of a network including block switches in which the invention can be used. A number of switching nodes N1 . . . N9 are interconnected by pairs of links for carrying traffic between nodes in opposite directions. The interconnecting links may also be duplex links on which two separate data streams in opposite directions can be transmitted.

Peripheral nodes PN 11, PN 12, etc. are each connected to one of the main nodes N1, etc. and function as concentrators or multiplexers for a plurality of attached terminal stations T11-1, T11-2, T11-3, T12-1 . . . etc.

It is the purpose of the complete network to communicate messages in the form of addressed data blocks between the terminal stations. The main nodes N1, N2, etc. operate as block switches, i.e., they accept and collect data blocks (messages) arriving on incoming links and forward each of them as complete data blocks to the appropriate outgoing link as determined by the destination address, for transmission to the next block switching node in the network.

Though the invention is explained in connection with this multiple-node meshed network, it is to be understood that the invention is also applicable to a communication system having only a single central block switch N1, thus forming the center of a star network.

It is assumed that each peripheral node accepts all messages furnished to it by the network, i.e., that it must not refuse messages because of unavailability of an associated destination terminal station. Availability and data rates must be negotiated in advance between stations involved in an exchange of messages.

Data Formats

The data formats used in the system are shown in FIGS. 2 and 3. Links are assumed to be byte-synchronized, and each byte has the basic structure of FIG. 2. A group of eight information bits is accompanied by two flag or marker bits for distinguishing between network and user information, and between data and control information, as shown in the following table:

| N/U | D/C | Meaning |
|-----|-----|---------|
| 0 | 0 | No information (idle characters) |
| 0 | 1 | Network control information (on link basis) |
| 1 | 0 | User data |
| 1 | 1 | User control information (end-to-end) |

One kind of network control information is the tokens which form part of the inventive concept and which are transmitted in a direction opposite to the associated data stream. Another kind of network control information may be framers serving to establish byte synchronization on the links. One example for user control information that is transmitted from source to destination is the end-of-block character (EOB).

The byte format could, of course, be modified, e.g., by additional flag/marker bits, or, as indicated in the drawings, by a priority bit PR for distinguishing high priority traffic from ordinary traffic, and by a parity check bit P.

Data blocks are of variable length and are transmitted in a frame structure as shown in FIG. 3. A destination address DA is followed by the information field INFO which comprises a variable number of bytes up to a given maximum, and this field is followed by an end-of-block character EOB. A flag F may be provided at one end or both ends of each frame.

This frame structure is well known from many systems. It may be modified, e.g., by inclusion of an origin (source) address, a control field, or a CRC character, but no further description appears necessary.

Inventive Solution

Figure 5:
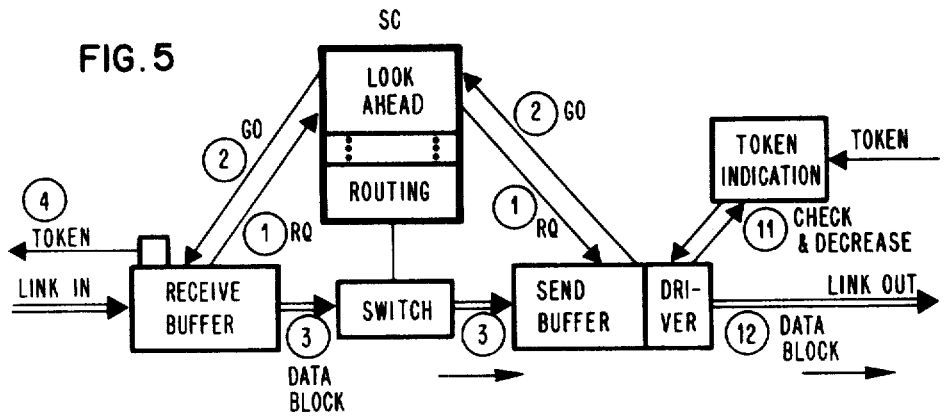
FIG. 5 is a block diagram illustrating a second form of the same inventive principle.

Two forms of the inventive block switch and flow control concept are depicted in FIGS. 4 and 5 and will be briefly explained here, while a more detailed discussion is given in connection with the description of the two embodiments.

Both figures show essential common parts of a block switch node, plus one selected incoming link and one selected outgoing link with their associated input/output circuitry.

In the arrangement of FIG. 4, a data block arriving on the "link in" is placed into an associated receive buffer. Then the following will be effected sequentially: (1) A request for a block transfer is presented together with the destination address to the switch control SC which comprises a look-ahead mechanism and a routing table. The request is forwarded to a token indicator at the appropriate "link out." (2) A test is made whether the block can be transmitted at once, i.e., whether it will be accepted in the next node. If not, the request is disregarded and must be raised or scanned again later. If the token test is positive, the token is deleted (or decreased, respectively). (3) Then, a GO signal is returned to the receive buffer holding the respective data block. (4)

The data block is then transferred through the switching mechanism, controlled by SC, to a driver of the selected output link, over which it is transmitted without further buffering. (5) A token is sent back to the previous node over a back channel parallel to the "link in" for updating the token indicator at that previous node (receive buffer space for another data block available).

The solution shown in FIG. 5 is very similar except that not only a receive buffer is provided for each "link in" but also a send buffer is provided for each "link out." Thus, each data packet is buffered twice in a switching node.

The following steps are executed: (1) When a block was accepted in the receive buffer, a request accompanied by the destination address is presented to switch control SC, which forwards the request to the send buffer of the appropriate "link out." If the buffer is full, the request is disregarded and must be raised or scanned again later. (2) If buffer space is available, a GO signal is sent back to the receive buffer. (3) The data block is then transferred through the switching mechanism into the appropriate send buffer. (4) A token is returned to the previous node to update the token indicator which then reflects the availability of the receive buffer space for another data block. (11) When the send buffer contains a data block, the associated driver will test the token indicator to determine whether buffer space is available in the next node for a data block. When the token test is positive, the token is deleted (or decreased, respectively). (12) A data block is then transmitted from the send buffer over the link out to the next node.

Prevention of Deadlocks by Lost Tokens

To avoid any deadlock situation in cases where a token has been lost (e.g., by transmission error), additional timeout circuitry can be provided at each output port that (a) would be started when the token indication is deleted or decreased because of a data block transmission; (b) would be stopped when a new token arrived within a given time limit; but (c) would force insertion of a new token or would force an increase of the token count in the token indicator after a preselected time delay, i.e., at the end of the timeout interval despite failure of a token.

In rare cases, i.e., when a token was not lost but actually encountered an unusually long delay, this timeout procedure could result in the loss of a data block which, however, will be recovered by normal end-to-end error control procedures. Introduction of such timeout procedure will, however, prevent any deadlock in a block switching node due to lost token.

At the peripheral links, i.e., those leading to peripheral nodes PN, the timeout interval should be set to zero so that a data block can always be dispatched to a peripheral node. It would be the peripheral node's responsibility to properly handle any data block received, either by immediately forwarding it to a terminal station, or by storing it intermediately.

(B) FIRST EMBODIMENT

A first embodiment of a block switch incorporating the invention is shown in the form of a block diagram in FIG. 6. The system using this block switch has the following basic characteristics:

(a) One buffer is provided per incoming link, no buffer (only a transmitter) is provided for any outgoing link, (b) Each link provides a data path from one node (block switch) to another in one direction, and an extra path in the reverse direction for token signals, (c) Transmitted data blocks (frames) have a variable length, up to a given maximum value, (d) Each buffer has a capacity for one data block of maximum length.

It is assumed that data are transmitted as a stream of bytes of the extended format shown in the previous section, with framers and end-of-block characters as indicated, and with a destination address at the beginning of each block (after the framer). A token is transmitted as a single pulse over the respective token line.

Basic Structure of Block Switch

The block switch comprises a plurality of input ports 12, 12' . . . , one for each incoming link, and a plurality of output ports 16, 16' . . . , one for each outgoing link. The link of input port 12 includes input data bus 22 and reverse token line 24. The link of output port 16 includes output data bus 26 and reverse token line 28.

Each of the other ports is also connected to a link including a data bus (22', 26') and a reverse token line (24', 28').

Each input port comprises a FIFO buffer (dribble-down buffer) 30 whose input is connected to the input data bus 22 and whose output is connected to a port bus 32. Each input port further comprises control circuitry 34 which is connected by a shift control line 35 to FIFO buffer 30, by a line 36 to a "valid data" indicator output of FIFO buffer 30, and to which token line 24 of the respective link is connected, and further comprises a latch 37 as token indicator which is connected by a set and a reset line to control circuitry 34.

Each output port comprises transmitting circuitry 38 whose input is connected to a port bus 40 and whose output is connected to output data bus 26, and further comprises a latch 42 to which token line 28 of the respective link is connected.

The block switch further comprises three functional units common to all ports: an Access Control Unit (ACU) 44, a Route Control Unit (RCU) 46, and a Look-Ahead Unit (LAU) 48.

A common data switch bus 50 is connected to each input port bus 32 by a data-in gate 52, and to each output port bus 40 by a data-out gate 54. Thus, data can be gated from each input port to any output port by activating the respective gates. A common destination address bus 56 connects each input port bus 32 via an address-in gate 58 to one input of Route Control Unit (RCU) 46. Each of address-in gates 58 is connected by a separate gate control line 60 to one associated output of RCU 46.

Each of data-in gates 52 is connected by a separate gate control line 62 to an associated output of Access Control Unit (ACU) 44. A separate request signal line (RQ) 64 connects the output of each latch 37 in an input port 12 to one input of ACU 44, and a separate go-ahead signal line (GO) 66 connects each control circuitry 34 in an input port 12 to an associated output of ACU 44.

Each data-out gate 54 is connected by a separate gate control line 68 to an associated output of Look-Ahead Unit (LAU) 48, and each latch 42 in an output gate 16 is connected by a separate interrogation line (IR) 70 to an associated input of LAU 48.

A requesting port identifier bus 72 interconnects ACU 44 and RCU 46, an output port identifier bus 74 interconnects RCU 46 and LAU 48, and a pair of notification lines 76 and 77 interconnects LAU 48 and ACU 44.

Finally, termination circuitry 78 is provided. It comprises a timeout circuit 80, the start input of which is connected via start line 82 to one output of ACU 44, an end-of-block detector 84 whose input is connected to data switch bus 50, and an OR gate 86 whose inputs are connected to timeout circuit 80 and end-of-block detector 84, respectively, and whose output is connected via stop line 88 to one input of ACU 44 and also to one input of LAU 48. Timeout circuit 80 is connected to the output of EOB detector 84, and it is further connected to a clock line 90 of the block switch. More detail of control circuitry 34 (34' . . . ) in input ports 36 (36' . . . ) and of ACU 44, RCU 46, and LAU 48 will be described in a later section of this specification.

Operation of Block Switch

When a data block (a frame) arrives on an input data bus 22, it is inserted into FIFO buffer 30 so that the first byte, i.e., the destination address can be sensed on port bus 32. The presence of valid data in FIFO buffer 30 also provides a signal for setting request latch 37 so that an RQ signal is raised on line 64 to ACU 44.

ACU 44 scans all request lines 64, 64' . . . cyclically or according to any other algorithm for detecting service requests. If an active RQ signal is detected, scanning is stopped, and ACU 44 sends an identifier for the respective input port over requesting port identifier bus 72 to RCU 46.

RCU 46 activates a gating signal on the gate control line 60 (60', . . . ) which is associated to the input port designated by the received identifier. Gate 58 (58', . . . ) is opened, and the destination address of the block waiting in FIFO buffer 30 of input port 12 is transferred over destination address bus 56 to RCU 46. Route Control Unit 46 then determines, with the aid of a stored routing table or any other algorithm, to which one of output ports 16, 16' . . . the waiting data block must be dispatched. An identifier designating the appropriate output port is then transferred via output port identifier bus 74 to LAU 48.

Look-Ahead Unit 48 then tests interrogation line 70 (70', . . . ) of the appropriate output port 16 to determine whether the token latch 42 indicates availability of receive buffer space at the remote end of the respective outgoing link (i.e. in the next block switch node in the network). Token latch 42 is reset by a token signal received on token line 28 from the remote end of the link each time the remote buffer is emptied. The latch is set again (to indicate that no buffer space is available) when a data block is dispatched from the respective output port 16 over the associated link.

If token latch 42 is in set condition when the test is made by LAU 48, indicating that no buffer space is available, a respective negative notification is sent by LAU 48 over notification line 76 which will cause ACU 44 to resume scanning of request lines 64, 64' . . . , etc.

If token latch 42 is in reset condition when the test is made by LAU 48, indicating that buffer space is available and that a data block may be dispatched, LAU 48 sends a respective positive notification over notification line 77 to ACU 44. LAU 48 then also raises a gate signal on gate control line 68 to open gate 54, thus connecting data switch bus 50 to the respective output port 16. This signal will also reset token latch 42. ACU 44, when receiving the positive notification signal on line 77, will raise a gating signal on the appropriate gate control line 62 to open gate 52 and thus connecting buffer 30 of requesting input port 12 to data switch bus 50.

ACU 44 will also send a GO signal over go-ahead signal line 66 to control circuitry 34 of the requesting input port. This circuit will cause request latch 37 to be reset, and will cause the sending of a token bit over line 24 to the token latch in the remote output port in the block switch node at the other end of the respective link (to indicate that due to dispatching of the block currently in buffer 30, buffer space will be available for another block to be received on input data bus 22).

Control circuitry 34 will then apply an activating signal to FIFO buffer 30 to cause shifting of the stored data block out of the buffer, through gate 52, data switch bus 50 and gate 54 to transmitting circuitry 38 in output port 16. Transmitting circuitry 38 will apply respective signals to output data bus 26 so that the data block will be transferred over that bus to a FIFO buffer in an input port in the next block switch node.

When the end-of-block (EOB) character appears on data switch bus 50, it will be recognized by EOB detector 84 in termination circuitry 78. This will cause a stop signal to be sent over line 88 to LAU 48 and ACU 44. These two units will thereupon terminate the gating signals on line 68 and line 62, and will also reset all internal circuitry associated with the input port and the output port that were participating in the data transfer.

Immediately after raising the gating signal on line 62 and the GO signal on line 66, ACU 44 will start scanning of request lines 62', etc. for detecting the next request from an input port, and for initiating the necessary look-ahead operation by RCU 46 and LAU 48. Thus, there is always an overlap between the transfer (switching) of one data block and the look-ahead procedure for the next data block.

If the requesting input port and the appropriate available output port for the next data block to be switched are determined by a scanning and a look-ahead operation before the current data block switching is finished, the respective indications for the input port and output port to be next activated remain stored. When the end-of-block character of the currently switched data block appears, the currently active data-in gate (52, 52', . . . ) and data-out gate (54, 54', . . . ) are deactivated, and immediately thereafter the already prepared activation of the next pair of data-in and data-out gates is effected. Only thereafter scanning for the over-next requesting input port is started.

To avoid blocking of the block switch when a data block is not dispatched from a selected input port, or when a data block despite available buffer capacity and prepared switched path is not completely transferred within a given time, timeout circuit 80 is started by a signal on start line 82 each time a GO signal is sent on a line 66, (66', . . . ) to an input port 12 (12', . . . ) from ACU 44. At the end of the given time interval, when timeout circuit 80 was not stopped by an EOB detection signal from EOB detector 84, a stop signal will be sent over line 88 to ACU 44 and LAU 48 to cause resetting of internal circuitry as described above, and selection of another waiting input port is started.

FIFO Buffers

Each of the FIFO or dribble-down buffers 12, 12', 12" . . . has the following characteristics:
It is one byte wide (extended byte format of FIG. 2).
Data entering at the input data bus 22 (22', . . . ) are automatically shifted through the buffer towards the output to the first available byte position (next to last occupied byte position).

Data are shifted out of the buffer to port bus 32 (32', ...) by pulses on shift control line 35 (35', ...), using one pulse per byte.

When a data byte is stored in the first buffer position (i.e., the one closest to port bus 32), the respective data byte is statically available on data bus 32 (32', ...). Furthermore, a static "valid data" indicator signal is available on line 36 (36', ...) as long as a data byte is stored in the first buffer position.

Details of Control Circuitry 34

Figure 7:
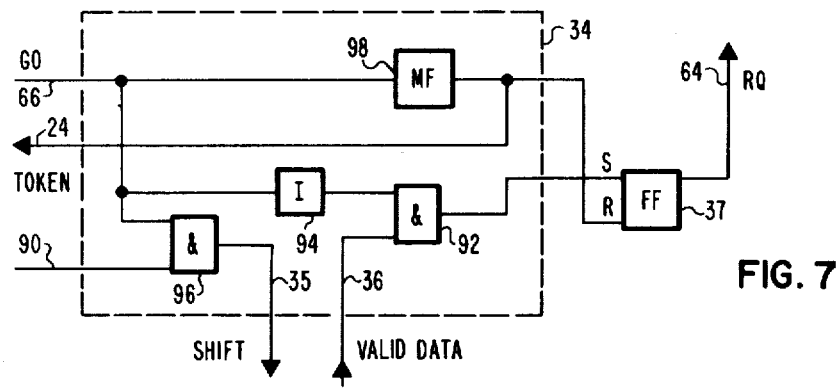

Some details of control circuitry 34 that is part of input port 12 are shown in FIG. 7. It contains AND gate 92 whose inputs are connected to "valid data" indicator line 36 and via inverter 94 to go-ahead signal line 66. The output of AND gate 92 is connected to the SET input of request latch 37. Thus request latch 37 is set whenever valid data are in FIFO buffer 30 but NOT during a data block transfer, i.e., when the GO signal is active.

Shift control line 35 for FIFO buffer 30 is connected via AND gate 96 to clock line 90 of the block switch and to go-ahead signal line 66, so that data are shifted out of the buffer as long as the GO signal is active.

A single-shot circuit 98 is also connected to go-ahead signal line 66. When the GO signal is activated, single-shot 98 issues one pulse which is transferred to the RESET input of request latch 37 so that the request signal RQ on line 64 is terminated, and which is also transferred as a token over reverse token line 24 to the token indicator on the remote side of the respective link (for indicating that space will be available in FIFO buffer 30).

Control circuitry 34' ... of the other input ports 12' ... is identical to the one described above.

Details of Access Control Unit (ACU) 44

Figure 8:
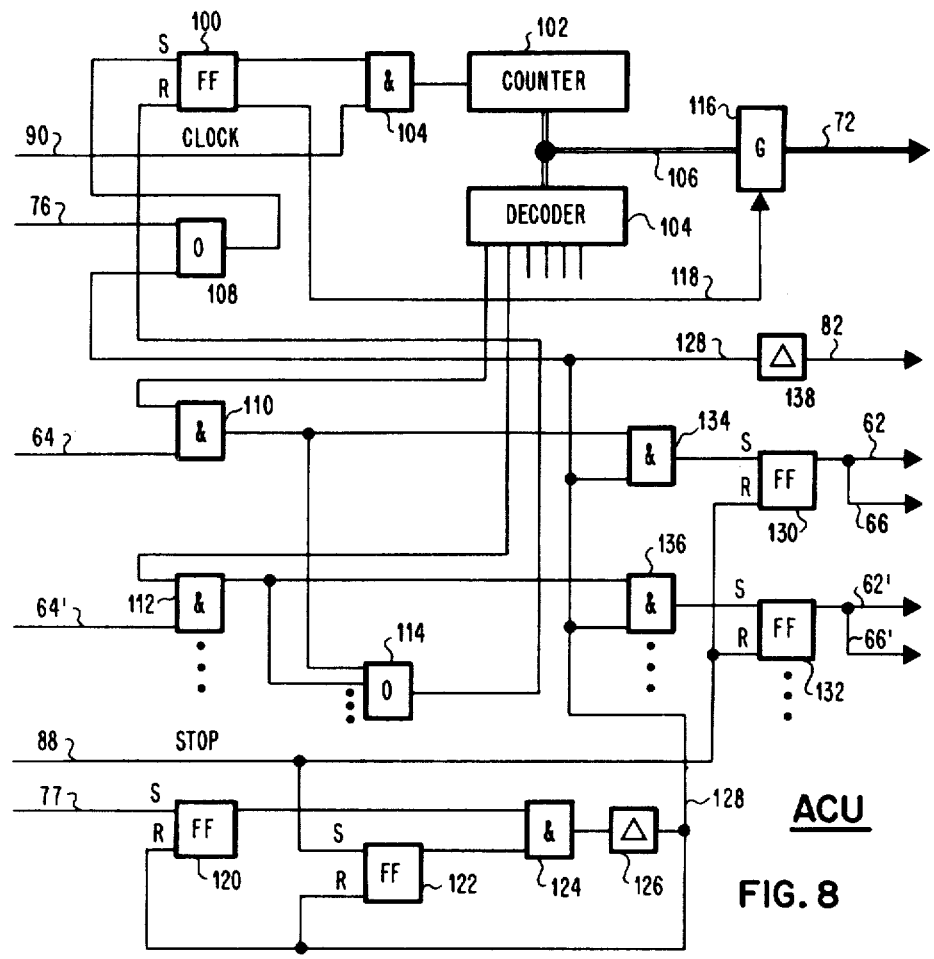

ACU 44 is shown in more detail in FIG. 8. It comprises a scan latch 100, a scan counter 102 which is connected through AND gate 104 to the TRUE output of scan latch 100, and a decoder 104 which is connected to the output of scan counter 102 via bus 106. Scan latch 100 is set via OR gate 108 whenever a negative notification signal from LAU 48 appears on line 76, or whenever a release signal (explained below) appears on line 128. Clock line 90 of the block switch is also connected to an input of AND gate 104 so that scan counter 102 is advanced by clock pulses as long as scan latch 100 is set. Decoder 104 will sequentially activate its output lines in response to the changing counter contents.

Each of the decoder output lines is connected to the first input of an associated AND gate 110, 112 ..., the other input of which is connected to one of the request lines 64, 64' ... from input ports 12, 12' .... The outputs of all AND gates 110, 112 ... are connected to the inputs of an OR gate 114 whose output is connected to the RESET input of scan latch 100. Thus, whenever the two inputs of one of the AND gates 110, 112 ... are active, i.e., when an input port just scanned has an active request signal, scan latch 100 will be reset.

This will stop scan counter 102 whose contents is then equal to the requested and now selected input port. Gating circuit 116 whose data inputs are connected to bus 106 and whose control input is connected via line 118 to the INVERSE output of scan latch 100 will now transfer the contents of scan counter 102 through its outputs and requesting port identifier bus 72 to route control unit (RCU) 46.

A look-ahead operation is then executed by LAU 48 which will return to ACU 44 either a negative notification on line 76 (to resume scanning) or a positive notification on line 77 (for initiating a data block transfer).

Two prepare latches 120 and 122 are provided for correctly controlling the data block transfers despite overlapping transfer and scanning operations. "Prepare 1" (latch 120) is set when a positive notification appears on line 77 to indicate that a data block transfer is possible from the input port presently designated by contents of scan counter 102. "Prepare 2" (latch 122) is set when a stop signal appears on line 88 indicating that a current data block transfer is terminated. Only when both prepare latches are set, AND gate 124 will produce, through delay element 126, a release signal on control line 128.

This release signal will start the next data block transfer as follows: One transfer latch 130, 132 ... is provided for each input port 12, 12' .... Its TRUE output is connected to gate control line 62 (62', ...) and to go-ahead signal line 66 (66', ...) of the associated input port. Its SET input is connected via an associated AND gate 134, 136 ... to the prepare signal output of the associated scan AND gate 110, 112 .... Thus, when a release signal appears on line 128, that one of transfer latches 130, 132 ... will be set whose prepare signal is active, i.e., the one which is associated to the input port designated by the present contents of scan counter 102.

At the end of a data block transfer, the stop signal on line 88 will reset all transfer latches 130, 132 ... (of which only one was active), and will set prepare latch 2 (122) (as indicated above). When the input and output ports for the next data block transfer where determined already, i.e., when prepare latch 1 (120) is set already, the stop signal on line 88 will immediately cause initiation of the next data block transfer. When the scanning and look-ahead operation is still under way, prepare latch 2 (122) will keep the indication that the previous data block transfer was finished, so that the next block can be initiated as soon as a positive notification arrives and causes setting of prepare latch 1 (120).

The release signal on line 128, besides starting the next data block transfer, also causes:

(a) Resetting of prepare latches 1 and 2, and (b) through a delay element 138 and start line 82 connected to termination circuitry 78, the starting of timeout circuit 80 (its function was described above) as well as the setting of scan latch 100 to restart the scanning operation.

Details of Route Control Unit (RCU) 46

Some details of RCU 46 are shown in FIG. 9. It comprises a decoder 140 whose input is connected to requesting port identifier bus 72. In response to a port identifier present on bus 72, one of the gate control lines 60, 60' ... is activated, thus opening the appropriate address-in gate 58, 58' .... The address which then appears on destination address bus 56 is used in addressing circuitry 142 to select one location in routing store or memory 144. This store maps each destination address into the appropriate output port number for the respective block switch. The selected output port number is transferred through storage or memory data register 146 and output port identifier bus 74 to LAU 48.

The routing store may be a read-only store if routing in the system is fixed, or it may be a loadable store into which appropriate routing data are loaded at regular intervals or in specific situations.

Details of Look-Ahead Unit (LAU) 48

FIG. 10 depicts some details of LAU 48. It comprises a decoder 148 whose input is connected to output port identifier bus 74 from RCU 46, and whose individual outputs are each connected to the first input of one AND gate 150, 152 . . . associated to one of the output ports 16, 16' . . . . The other input of each AND gate 150, 152 . . . is connected to the interrogation line 70, 70' . . . of the respective output port.

One OR gate 154 is connected to the outputs of all AND gates 150, 152 . . . and delivers an active output signal on line 76 (negative notification) when the token latch of the interrogated output port is set, i.e., when the data buffer on the remote end of the respective link is occupied and no further data block must be transmitted.

Another OR gate 156 is connected to all output lines of decoder 148. One input of an AND gate 158 is connected to the output of OR gate 156, and its other input is connected through inverter 160 to the negative notification line 76. AND gate 158 delivers an active output signal on its output line 77 (positive notification) when any output port number is present on bus 74, but no active signal is present on the associated interrogation line 70 (70', . . . ). The signal on line 77 indicates that a data block can be dispatched through the respective output port (because the token latch is not set, i.e., buffer space is available at the remote end of the link).

Two prepare latches 162 and 164 are provided, similarly as in ACU 44. "Prepare 1" (Latch 162) is set by a signal on line 77 to indicate that an input port and the appropriate output port are ready for a data block transfer. "Prepare 2" (latch 164) is set by a stop signal on line 88 to indicate that the previous data block transfer is finished. AND gate 166 connected to the outputs of latches 162 and 164, and delay element 168 connected to the output of AND gate 166 will furnish a release signal on line 170 when both prepare latches are set.

A transfer latch 172, 174 . . . and an associated AND gate 176, 178 . . . are provided for each output port 16, 16' . . . . The first input of each AND gate 176, 178 is connected to an associated output of decoder 148 to receive a prepare signal for the respective transfer latch (i.e., the one associated to the output port presently designated by the output port identifier on bus 74). When the release signal appears on line 170, the respective transfer latch 172 (174, . . . ) is set and activates the gate control signal on its output line 68 (68', . . . ) for the data-out gate 54 of the respective output port. This signal also resets token latch 42 (42', . . . ) of this output port to indicate at the next interrogation that a data block was dispatched (and no other one is to be transmitted on that link before a token resetting the token latch is received from the remote end).

At the end of a block transfer, the stop signal on line 88 resets all transfer latches 172, 174 . . . .

The correct sequencing for setting and resetting transfer latches 172, 174 . . . despite overlapping data block transfers and scanning operations is ensured by prepare latches 162 and 164 in the same way as described above for ACU 44.

(C) SECOND EMBODIMENT

Another embodiment of a block switch incorporating the invention is shown in FIG. 11 as a block diagram. In contrast to the first embodiment, the system using this block switch is assumed to have the following characteristics:

(a) Two buffers are provided per link, a transmit buffer in the block switch where the link begins, and a receiver buffer in the block switch where the link ends. Thus, each block switch includes one receive buffer per incoming link and one transmit buffer per outgoing link, (b) Each link provides a data path from one node (block switch) to another in one direction, but can carry also return signaling information for a parallel link that provides a data path in the opposite direction between the respective two nodes, (c) Transmitted data blocks (messages) have a given fixed length, (d) Each buffer (receive buffer, send buffer) has a capacity of several fixed-length blocks.

As in the first embodiment, it is assumed that data are transmitted as a stream of extended-format bytes in frames with end-of-block characters, as described in section (A) above. With the aid of the two indicator bits N/U and D/C, it is possible to insert a token into the data stream even within a block, so that a data link is available for token transmission at any time. Some further explanations will follow in the subsequent operation description of this second embodiment.

Basic Structure of Block Switch

The block switch of this second embodiment comprises, as shown in FIG. 11, a Switch Control Unit (SCU) 200, a plurality of receive buffers 202, 204, . . . (one for each incoming link) and a plurality of transmit buffers 208, 210, . . . (one of each outgoing link). Each of these buffers is a FIFO (dribble-down) buffer. For each receive buffer, an input access control unit 214, 216, . . . is provided, and for each transmit buffer an output access control unit 220, 222, . . . is provided. Each receive buffer has an associated separator 226, 288, . . . which is connected to the incoming data bus 232, 234, . . . of the respective link, and which separates the bytes of the received data stream to different outputs, according to their category (framer, token, or user data byte). Each transmit buffer has an associated assembler and token handler 238, 240, . . . which is connected to the outgoing data bus 244, 246, . . . of the respective link, and which assembles bytes (framers, tokens, user data bytes) into a data stream for transmission over the link.

It is assumed that the connection between each node block switch such as the one shown in FIG. 11 and any other similar intermediate node or terminal node comprises a pair of two links carrying traffic in opposite directions, so that, e.g., data buses 232 and 244 are connected to the same remote block switch A, data buses 234 and 246 to another remote block switch B, etc.

Within the block switch of FIG. 11, several common buses and control lines are provided which are all connected to Switch Control Unit (SCU) 200: Data bus 250 for one parallel byte, destination address bus 252 for one parallel byte, data path activation control line 254, data path deactivation control line 256, and clock line 258 are connected to all input access control (IAC) units 214, 216 . . . and to all output access control (OAC) units 220, 222 . . . . A poll line 260 and a poll counter reset line 262 are connected to all IAC units 214, 216 . . . . A data buffer full indicator line 264 is connected to all OAC units 220, 222 . . . .

To enable exchange of token information between two associated links of a pair of links connected to the same remote block switch, specific control lines are provided. A token-line 266, 268, . . . connects an output of each separator 226, 228, . . . of an incoming link to an input of the assembler (and token handler) 238, 240, . . . of the associated outgoing link. A token-out line 272, 274, . . . connects an output of each IAC unit 214, 216, . . . of an incoming link to another input of the assembler (and token handler) 238, 240, . . . of the associated outgoing link.

Between each separator 226, 228 . . . and its associated receive buffer 202, 204 . . . there is provided a byte-wide connection 278, 280 . . . , and between each receive buffer 202, 204 . . . and its associated IAC unit 214, 216 . . . there is provided a byte-wide connection 284, 286 . . . (plus two single bit control lines which are, however, not shown in FIG. 11 but only in FIG. 13).

Between each OAC unit 220, 222 . . . and its associated transmit buffer 208, 210 . . . there is provided a byte-wide connection 296, 298 . . . (plus a single bit control line not shown in FIG. 11 but only in FIG. 14), and between each transmit buffer 208, 210 . . . and its associated assembler and token handler 238, 240 . . . there is provided a byte-wide connection 290, 292 . . . (plus two single bit control lines not shown in FIG. 11 but only in FIG. 16).

More details of the several functional units shown in FIG. 11 will be explained in subsequent sections, after the following explanation of the block switch operation.

Operation of the Block Switch

There are two function areas of the block switch of this embodiment which closely cooperate but which are separated by the buffers: (a) switching, i.e., selective transfer of data blocks from receive buffers to appropriate transmit buffers as specified by the block destination address, and with the aid of a look-ahead function, and (b) transmission of data blocks to links, and reception of data blocks from links, under control of tokens. The two function areas will be described now in sequence.

(a) Switching between buffers: Switch Control Unit (SCU) 200 issues a poll pulse over line 260 each time it wants to solicit a new switch action. The pulse advances a counter in each IAC unit 214, 216, . . . . . All counters have the same setting but each IAC unit has a unique internal unit address, so that only one IAC unit and its associated receive buffer are selected at a time.

If the respective receive buffer, e.g., 202, contains no data, no information will be transferred to address bus 252, and SCU 200 will issue another poll pulse to thus poll the next IAC unit 216.

If, however, buffer 202 contains at least one data block, its destination address (which is the leading byte) is gated by IAC unit 214 to the common destination address bus 252. Each OAC unit 220, 222, . . . receives this destination address, and determines whether its associated link is the appropriate link for this destination. Only one OAC unit, e.g., unit 222, is thus alerted. If its associated transmit buffer 210 is full and cannot accept one more data block, an inhibiting signal "data buffer full" is sent over line 264 to SCU 200. The SCU will then resume polling by sending another poll pulse on line 260.

If, however, transmit buffer 210 is not yet full, the absence of the "data buffer full" indication will cause SCU 200 to issue an "activate data path" signal on line 254. This signal will cause previously activated IAC unit 214 to initiate transfer of the next data block (i.e. from the leading byte up to next EOB character) from receive buffer 202 to data bus 250, and it will cause presently active OAC unit 222 to transfer sequential bytes of the data block into transmit buffer 210. When the end-of-block (EOB) character appears on data bus 250, it will be recognized by SCU 200 which then issues a "data path deactivate" pulse on line 256 to cause termination of the data transfer by active access control units 214 (input) and 222 (output).

Because all buffers are FIFO (or dribble-down) buffers, the first byte of the oldest data block (if any) is always present at the buffer output, and newly entered data are always queued up directly behind the end of the last-previous entered data block.

When SCU 200 issued the "activate data path" signal, the block transfer can be effected between the two buffers by the activated access control units (214 and 222) without further assistance of the Switch Control Unit. Thus, the latter can resume polling by issuing another poll pulse on line 260 to prepare transfer of the next data block during actual transfer of one data block. Thus, there is always some overlap of actual transfer and next transfer preparation thus saving time.

A "reset poll counters" signal can be issued on line 262 to all IAC units 214, 216, . . . to ensure identical setting of all poll counters when system operation is initialized, after a failure, or at regular intervals.

(b) Transmission and reception of data blocks to and from links: A data block must be dispatched over a link only if the receive buffer at the remote end can accept it. A token is sent back from the receive buffer of a link to its transmit buffer whenever one data block is removed from the receive buffer (and switched through the respective block switch to another link's transmit buffer), and the token count is decreased when a data block is dispatched to the link (for transfer into the remote receive buffer of the same link).

In the present embodiment, the token (a network control byte) is not sent on the respective link itself, because links are unidirectional, but it is sent over the paired counter link in a cycle-steal or piggyback fashion.

FIFO Buffers

Each of the FIFO or dribble-down buffers 202 . . . 210 has the same design and characteristics as the FIFO buffers of the first embodiment, so that description need not be repeated here.

Details of Switch Control Unit (SCU) 200

Figure 12:
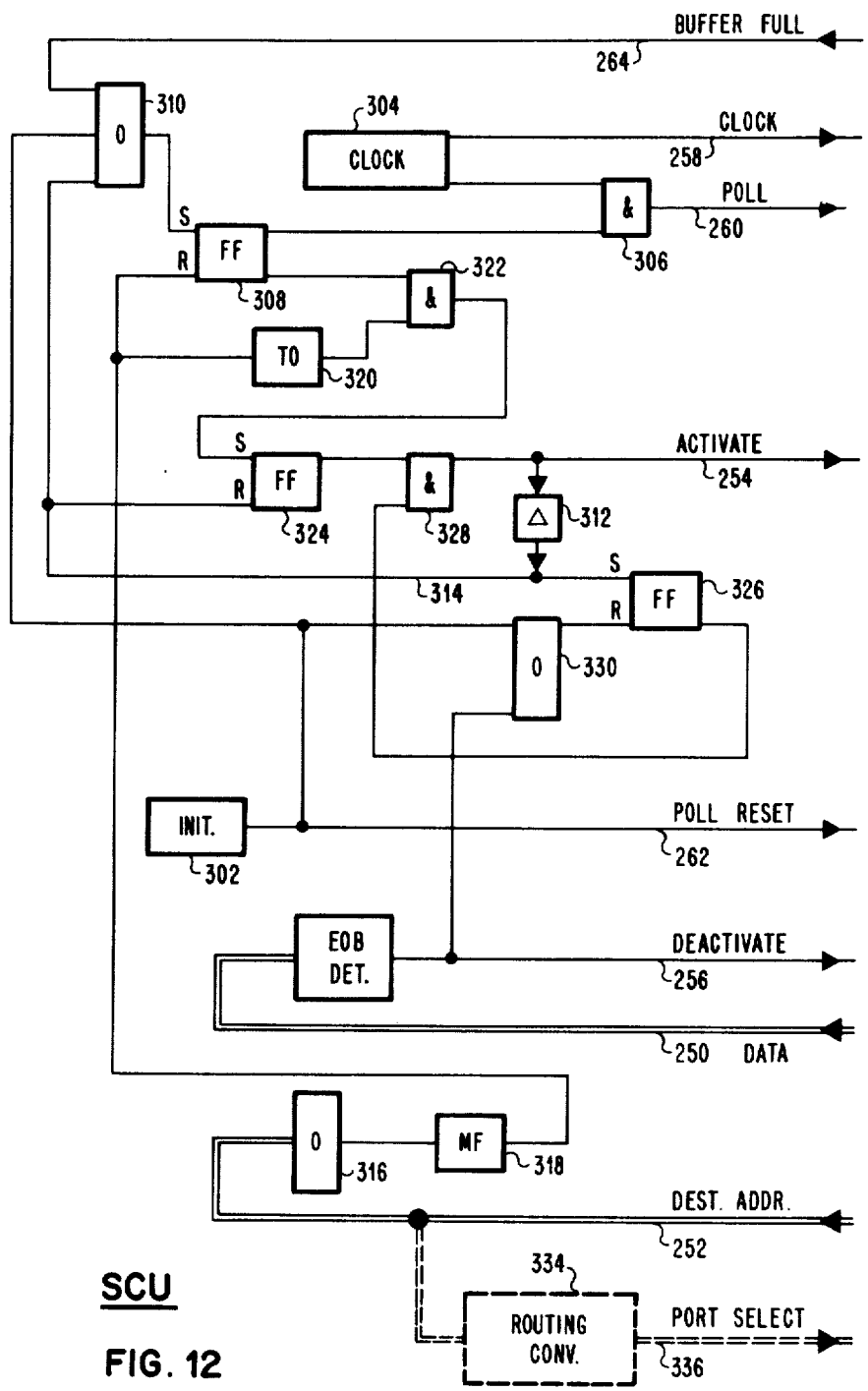

FIG. 12 shows some details of SCU 200. Initiation circuitry 302 which may be manually controlled can furnish a pulse on line 262 for initial or intermediate resetting of poll counters and other circuits and functional units. A clock generator 304 issues clock pulses for all block switch components on clock line 258, and also issues a slower sequence of poll pulses which are applied through an AND gate 306 to poll line 260. The second input of AND gate 306 is connected to the TRUE output of a poll latch 308 so that poll pulses are only sent to the port units when the poll latch is set. The SET input of latch 308 is connected through OR gate 310 to buffer full indicator line 260 and—via a delay element 312 and line 314—to data path activation control line 254. Thus poll latch 306 is set to resume polling whenever the data path is activated for a data block transfer, or when an interrogated output buffer is full. One further input of OR gate 310 is connected to initiation circuitry 302, for initial setting of poll latch 308.

The individual bit lines of destination address bus 252 are connected to the inputs of an OR gate 316 whose output is connected through single-shot circuit 318 to the RESET input of poll latch 308. Thus, whenever during a poll operation any destination address appears on bus 252, the poll sequence is stopped.

The output of single-shot 318 is also connected to the input of a timeout circuit 320. An AND gate 322 has its inputs connected to the output of timeout circuit 320, and to the COMPLEMENT output of poll latch 308, and its output is connected to the SET input of a ready latch 324. This latch indicates when the last polled input port and the appropriate interrogated output port are ready for a data block transfer. It is set when the poll sequence was stopped due to appearance of a destination address, and when thereafter no "buffer full" indication was received on line 264 within a time interval determined by timeout circuit 320. Ready latch 324 is reset by a pulse on line 314 when the data path between the ready ports is actually activated by the signal on data path activation control line 254 (which also causes resuming of the scanning sequence as indicated above).

To ensure proper sequencing of data path activation for consecutive data blocks despite overlapping, polling and transferring operations, interlock latch 326 and AND gate 328 are provided. The two inputs of AND gate 328 are connected to the TRUE output of ready latch 324 and to the COMPLEMENT output of interlock latch 326. Its output is the data path activation control line 254. The SET input of latch 326 is connected by line 314 and delay element 312 to the output of AND gate 328, i.e., to data path activation control line 254. Its RESET input is connected through OR gate 330 to data path deactivation line 256 and to an output of initiation circuitry 302. Data path deactivation control line 256 is connected to the output of an end-of-block detector which has its inputs connected to data bus 250, so that a pulse is furnished on line 256 whenever an EOB character appears on the data bus.

The interlock circuitry operates as follows: initially, interlock latch 326 is reset by a pulse from initiation circuit 302 so that AND gate 328 is prepared. When a pair of ports (input and output) are ready for a data block transfer, ready latch 324 is set and the ACTIVATE signal on line 254 is raised to enable transfer of a data block. After a short delay, interlock latch 326 is reset to inhibit AND gate 328, ready latch 324 is reset, and poll latch 308 is set to resume polling. When another pair of ports is ready, latch 324 is set again but AND gate 328 blocks the output signal of ready latch 324. Only when the current data block transfer is finished (EOB on the data bus) interlock latch 326 is immediately reset, thereby allowing the issuance of another data path activation pulse from ready latch 324 through AND gate 328 to line 254.

Data path deactivation control line 256 could be further connected to the output of a timeout circuit (not shown in the drawing) which is activated each time a pulse appears on data path activation control line 254. Thus, if an end-of-block character would not appear on the data path within a given time after its activation, a deactivation signal would be generated automatically to avoid a deadlock situation in case of an error.

As indicated in dashed lines in FIG. 12, a routing converter 334 may be provided with its inputs connected to destination address bus 252. Its output would be a port select bus 336 connected to all output ports (not shown in FIG. 11). With this alternative, a destination address furnished by a polled input port would not be directly forwarded to all output ports for interrogation; instead, the destination address would be first converted with the aid of an assignment table stored in routing converter 334 before redistribution to the output ports.

Details of Input Access Control Units (IAC)

Figure 13:
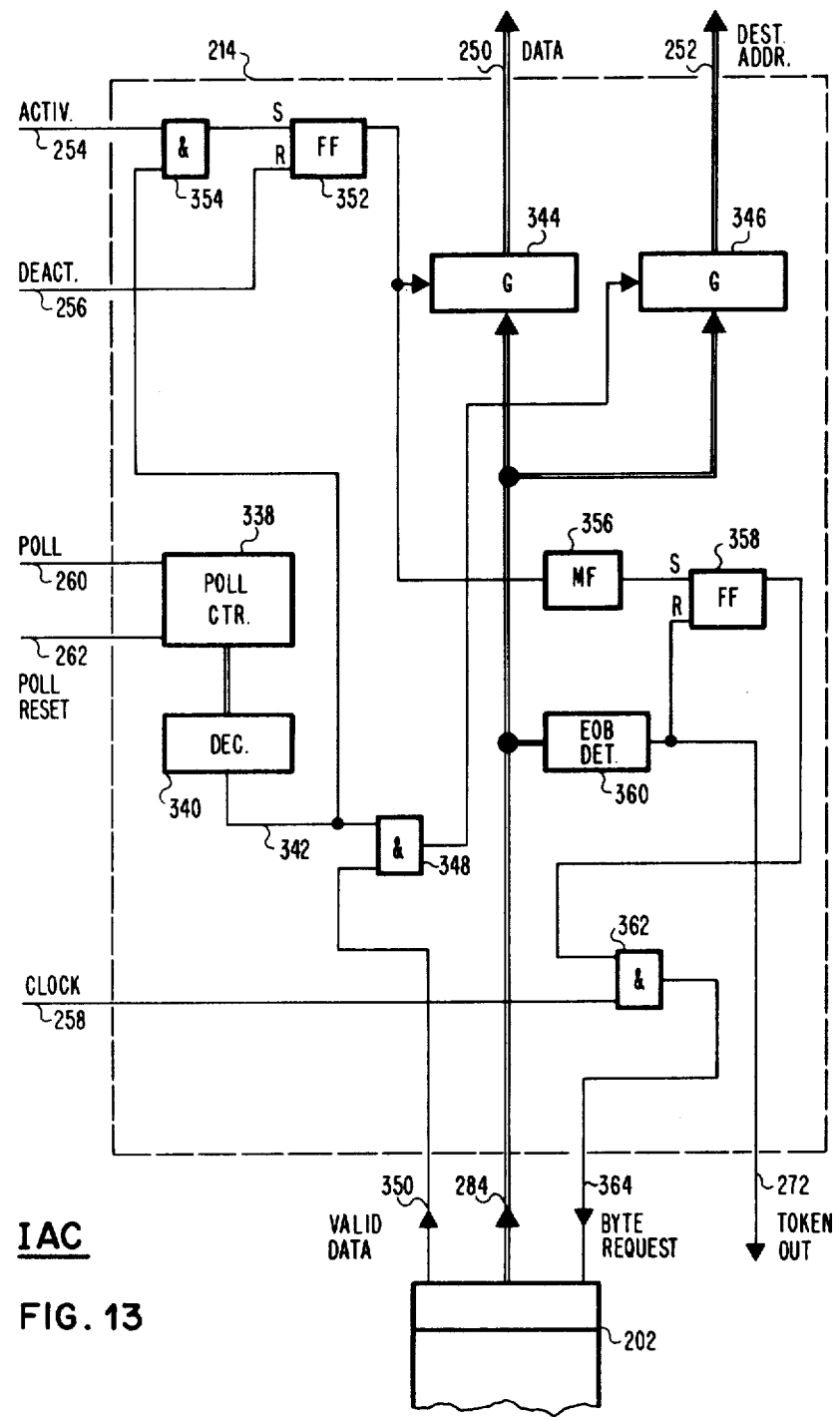

Input access control units 214, 216 . . . are all the same, and one of them, IAC 214, is shown in more detail in FIG. 13.

A poll counter 338 is connected to poll line 260 for receiving advancing pulses, and to poll counter reset line 262. A decoder 340 connected to poll counter 338 has a single output line 342 which carries an active output signal when the counter contents is equal to the identification number of the respective input port. Connected to port bus 284 from the output of receive buffer 202 are two gating circuits 344 and 346. The output of gating circuit 344 is data bus 250, and the output of gating circuit 346 is destination address bus 252.

The control input of gating circuit 346 is connected to AND gate 348 whose inputs are output line 342 of decoder 340 and a valid data indicator line 350 which is connected to the first position of receive buffer 202. Thus, gates 346 are opened to gate the destination address from buffer 202 to bus 252 when the respective port is polled and its receive buffer is not empty.

An activation latch 352 has its SET input connected through AND gate 354 to data path activation control line 254, and its RESET input to data path deactivation control line 256. The other input of AND gate 354 is connected to decoder output line 342. Latch 352 is set by an activation pulse only when the respective port is just polled, and is reset by any deactivation pulse. The output (TRUE) of activation latch 352 constitutes the control input for gates 344, and is also connected via single-shot circuit 356 to the SET input of a read control latch 358.

An end-of-block detector 360 receives its input data from port bus 284, and its output signal is applied to the RESET input of read control latch 358. The output of latch 358 is connected via AND gate 362 and read line 364 to a read control input of receive buffer 202. The other input of AND gate 362 is connected to clock line 258. Thus, when latch 352 is set, gates 344 between buffer 202 and data bus 250 are opened, and read pulses are applied to the buffer for releasing single bytes sequentially until an EOB character is detected.

The output of EOB detector 360 is also connected via line 272 to assembler and token handler unit 238 of the paired output port to transfer a token bit when an EOB character is encountered, i.e., when a complete data block has left receive buffer 202.

Details of Output Access Control Units (OAC)

Output access control units 220, 222, . . . are all the same, and only one of them, OAC 220, is shown in more detail in FIG. 14.

It contains gating circuitry 366 for interconnecting data bus 250 and port bus 296 which is the input to transmit buffer 208. The control input of gates 366 is taken from the TRUE output of an activation latch 368 which has its SET input connected through AND gate 370 to data path activation control line 254, and its RESET input to data path deactivation control line 256. The other input of AND gate 370 is an output line 372 from a decoder 374 that receives its input data from destination address bus 252.

The signal on line 372 is activated whenever a waiting data block that presents its destination address on bus 252 must be forwarded through the link associated to the respective output port. Decoder 374 may contain a read-only store or a loadable routing table. The input source for decoder 374 may alternatively be a port select bus 336 (as indicated above in the description of SCU 200) instead of destination address bus 252.

Decoder output line 372 is also an input to an AND gate 376, the other input of which is a buffer full indicator line 378 connected to the last position of transmit buffer 208. The output of AND gate 376 is buffer full indicator line 264 which is connected to SCU 200.

Thus, when the respective output port is selected by a destination address, it either issues a "buffer full" signal or, after receiving the data path activation signals, opens gates 366 for gating a data block into its buffer 208.

Details of Separators and of Assemblers

All separators 226, 228, . . . of input ports are the same, and all assemblers and token handlers 238, 240, . . . are the same. Therefore, only one of each is shown in more detail in FIGS. 15 and 16, respectively.

Separator 226, shown in FIG. 15, simply contains gating circuitry 380 for interconnecting incoming data bus 232 (link from remote unit) and data-in bus 278 which is the input to receive buffer 202, and it contains further a decoder whose input is also incoming data bus 232. This decoder evaluates the two control bits N/U and D/C of each incoming data byte. It energizes its output line 384 to the control input of gates 380 when a user data byte is present, and energizes its output line 266, the "token-in" line, when a token byte is present on the incoming data bus. This token-in line 266 is connected to assembler 238 of the paired output port.

In the separator, there may be provided additional decoder output lines for, e.g., also detecting framers, and it may be equipped with additional gating circuits controlled by decoder output lines to be able to present complete token bytes or framer bytes on separate outputs. For the present embodiment, however, it is sufficient to only provide the user data bytes on data-in bus 278 and a token-in indication bit on line 266.

Assembler and token handler 238, shown in FIG. 16 and in the following shortly termed assembler, comprises a multiplexer 386, one input of which is connected to data-out bus 290 from transmit buffer 208, and whose output is the outgoing data bus 244 (link to remote unit). Another input of multiplexer 386 is in connection to the output of a read-only store 388 which provides special characters such as tokens, framers, and idle characters which are to be inserted into transmitted frames (besides the actual user data bytes). A timing input of multiplexer 386 is connected to block switch clock line 258. If necessary, this timing input, as well as all other clock inputs in the assembler, may be connected to a network clock line (not shown here) instead of the block switch internal clock line 258.

Three latches are provided for controlling the transfer of characters to the multiplexer: buffer read latch 390, token out latch 392, and framer out latch 394. (Additional control latches may be provided when other types of characters are to be transmitted). Their interconnection and operation is explained later.

A token counter 396 is provided for indicating whether space is available for one or more data blocks in the receive buffer at the remote end of the link. Its increase input is connected to token-in line 266 from separator 226 for increasing counter contents by one unit whenever a token is received from the remote end. Its decrease input is connected by a line 397 to the output of an end-of-block detector 398 which is attached to data-out bus 290, for decreasing counter contents by one unit whenever a complete block was transmitted from the respective output port. The signal on output line 400 of token counter 396 is active when the counter contents is greater than or equal to one, i.e., when another data block may be transmitted.

For initializing or resetting the contents of token counter 396, a token value representing the complete available receive buffer capacity could be transmitted from the remote node over link 232 and separator 226 to assembler 238 (FIG. 11) and inserted into a special input of token counter 396 (FIG. 16). A byte-wide connection would have to be provided for this purpose between separator 226 and assembler 238, as indicated in dashed lines in FIGS. 15 and 16.

A "valid data" indicator line 402 is connected to the first position of transmit buffer 208 and carries an active signal when a data byte is waiting for transmission in the first buffer position.

Signals of lines 400 and 402 are combined in an AND gate 404. The output of AND gate 404 is transferred to the SET input of buffer read latch 390 via AND gate 406 which is enabled by clock pulses on line 258 which is connected to its second input. The RESET input of buffer read latch 390 is connected to the output of end-of-block detector 298. Thus the latch is set when the transmit buffer contains valid data and the token count is ≧1, and is reset when an EOB character was transmitted. It may also be reset by the output pulse of a timeout circuit (not shown) to avoid a deadlock situation when no EOB character is detected within a given time after starting the read operation.

The output of buffer read latch 390 causes release of clock pulses through AND gate 408 and a byte request line 410 to the shift input of transmit buffer 208. Each pulse on line 410 causes release of one data byte from the buffer to data-out bus 290. The generation of byte request pulses is inhibited by two AND gates 412 and 414 whenever a control byte is to be transmitted.

Token out latch 392 is set by each pulse on token-out line 272 from input access control unit 214, to cause sending of a token to the remote location when a complete data block was dispatched from receive buffer 202. Its TRUE output is connected through timing gate 416 to a token address circuit 418 which causes, when activated, the readout of a token byte from ROS 388 to multiplexer 386. The COMPLEMENT output of token out latch 392 is connected to inhibit AND gate 412 to prevent readout of data bytes when a token is to be transmitted. Thus, a token character can be inserted into the data stream at any time. Token out latch 392 is automatically reset after a given time with the aid of single-shot circuit 420.

Framer out latch 394 is set each time an EOB character was transmitted to cause insertion of a framer byte after the end of a data block. Its SET input is connected to the output of EOB detector 398. Instead of the EOB detect signal, any other control signal could as well be used for setting latch 394 and thus causing transmission of a framer, e.g., for maintaining byte synchronization.

The true output of framer out latch 394 is connected through inhibit AND gate 422 and timing gate 424 to a framer address circuit 426 which causes, when activated, the readout of a framer byte from ROS 388 to multiplexer 386. The second input of inhibit AND gate 422 is connected to the COMPLEMENT output of token out latch 392 to prevent transmission of a framer byte when a token byte—which has priority—is to be transmitted. The COMPLEMENT output of latch 394 is connected to a second input of inhibit AND gate 414 to prevent release of a data byte during transmission of a framer byte. Framer out latch 394 is automatically reset after a given time with the aid of single shot circuit 428.

When neither data bytes nor control bytes are transmitted, idle characters should be applied to the link for maintaining synchronization. An OR gate 430 is connected to the TRUE output of all three latches 390, 392 and 394. Thus, inverter 432 connected to its output furnishes an active output signal only when all latches are reset, i.e., when no data or control characters are readout. This output signal is transferred through timing gate 434 to idle character address circuitry 436 which causes, when activated, the readout of an idle character from ROS 388 to multiplexer 386.

(D) ALTERNATIVES

Two embodiments of the invention were disclosed. Of course, several modifications of these embodiments are possible within the scope of the invention. Some will be briefly discussed here.

Token

Instead of a single-bit token, a numerical token value, or token count could be transmitted from the receiving end to the transmitting end of a link, for conveying information about the size of the buffer space that is available, e.g., when transmitted data blocks are of variable length. In this case, the token indicator must be a register for a numerical value, or a counter, as was shown in the second embodiment. Some arithmetic circuit must then also be provided for adding the received token value to the locally available token remainder. When a data block is dispatched, its length value would have to be presented to the token circuitry so that the token value could be decreased accordingly (the remainder must always reflect available buffer capacity in the receive buffer of the next node).

A further possibility for the token mechanism in the case of variable block length is the following: a counter at each receive buffer's output counts the number of bytes taken out of the buffer, and for a given increment of k bytes (e.g., 256 bytes), i.e., when the counter overflows, one single-bit token is returned to the previous node. There, the token indicator contents would be increased by one unit for each received token bit, and a current count value n would indicate the n.k bytes could be accepted in the receive buffer of the next node. A counter at the transmitting end of each link would also count transmitted bytes, and after each increment of k bytes would send a token bit to the token indicator for decreasing its contents by one unit.

Single Switch Network

The implemented nodes described in the specification were parts of a multiple node network. The invention can, however, also be used in a single switch star network. In this case, there will be only one block switching node N (instead of nodes N1 ... N9 shown in FIG. 1), and each "previous" node as well as each "next" node for this block switch is a peripheral node PN 11, PN 12, etc.

Buffer Types

Instead of using FIFO buffers or dribble-down buffers, as disclosed in the embodiments, other types of buffers can as well be used, e.g., ordinary shift registers, with appropriate circuitry for indicating whether any data are contained in the buffer, and for shifting out the contents when a GO signal is present.

(E) MEANS FOR PREVENTING OF DEADLOCKS BY LOST TOKENS

A timeout circuit for preventing a deadlock situation when a token is lost, as mentioned in section A, could be provided for each output port. In the first embodiment of FIG. 6, such circuit can be incorporated into each output port 16 in connection with token indicator latch 42. Its start input would be connected to line 68, its stop input to line 28, and its timeout pulse output would be connected to the RESET input of token indicator latch 42, to force a token into the latch when a timeout pulse occurs. Similar timeout circuitry can be provided for the second embodiment in the assembler shown in FIG. 11, in connection with token counter 396 and control line 266 and 397.

While the invention has been particularly shown and described with reference to the preferred embodiments thereof, it will be understood by those skilled in the art that numerous changes in form and detail may be made therein without departing from the spirit and scope of the invention.

Having thus described our invention, what we claim as new, and desire to secure by Letters Patent is:

1. In a communication network including a plurality of block switching nodes interconnected by links (22, 26) with a receive buffer (30) being provided for each incoming link in each node, a flow control mechanism in each node characterized by:
   means (42) for maintaining a token indication at the sending end of each link, reflecting available buffer capacity in the receive buffer at the receiving end of said link in the next node,
   means (28, 68) for updating said token indication when a data block is transmitted over the respective link, and also when a token updating signal is received from the next node,
   means (46, 48, 56, 58, 60, 70, 72, 74) for looking ahead across the node when a data block is to be dispatched from a receive buffer, to the token indication means of the appropriate outgoing link, and means (38, 40, 50, 52, 54, 62, 66, 68, 77) to cause transfer of said data block through the node and over the link to the next node in response to the current state of the token indication, and
   means (24, 34) for transmitting a token updating signal to the token indication means at the respective link in the previous node when a data block is dispatched from a receive buffer (FIG. 6).

2. In a communication network including a plurality of block switching nodes interconnected by links (232,244) with a receive buffer (202) being provided for each incoming link and a transmit buffer (208) being provided for each outgoing link in each node, a flow control mechanism in each node characterized by:

means (396) for maintaining a token indication at each transmit buffer reflecting available buffer capacity in the receive buffer at the receiving end of the respective link, means (266, 382, 397, 398) for updating said token indication when a data block is transmitted from said transmit buffer, and also in response to a received token updating signal, means (252, 264, 372, 374, 376, 378) for looking ahead across the node when a data block is to be dispatched from a receive buffer, to the transmit buffer of the appropriate outgoing link and means (250, 254, 256, 344, 352, 354, 366, 368, 370) to cause transfer of the data block to said transmit buffer when buffer space is available, means (272, 360, 388, 392, 416, 418) for transmitting a token updating signal to the token indication means at the respective link in the previous node when a data block is dispatched from a receive buffer (FIG. 11 .. . FIG. 16).

3. Flow control mechanism according to claim 1 or 2, characterized in that said means for causing transfer of a data block can operate independently from said look-ahead means so that during transfer of one data block an overlapping look-ahead operation for a next data block to be dispatched can be effected.

4. Flow control mechanism according to claim 1 or 2, characterized in that each said token indication updating means is connected to an incoming link (232), for separating a token updating signal from the received data stream and transferring it to said token indication maintaining means, and that each said token updating signal transmitting means is connected to an outgoing link (244) for inserting a token updating signal into the transmitted data stream.

5. Flow control mechanism according to claim 1 or 2, characterized in that each said token indication maintaining means (396) is a counter for maintaining an accumulated token indication.

6. Flow control mechanism according to claims 1 or 2 characterized in that means (44, 64) are provided for polling said receive buffers to preselect one buffer containing a data block to be dispatched; and that said look-ahead means comprise circuitry (46, 48, 56, 58, 60) for gating a destination address furnished by said preselected receive buffer, and for preparing, in response to said destination address a testing and transfer path to the circuitry (16) associated with the appropriate outgoing link.

7. Block switching node in a communication network, for selectively transferring addressed data blocks from a plurality of incoming links (22, 22'; 232, 234) to a plurality of outgoing links (26, 26'; 244, 246), a receive buffer (30; 202, 204) being provided for each incoming link, said block switching node comprising a flow control mechanism and being characterized by:

output circuitry (16, 16'; 208, 220, 238, 210, 222, 240) for each outgoing link for receiving a data block in transfer from a receive buffer to the associated outgoing link, and including token indication means (42; 396) for receiving token signals and reflecting available buffer capacity in the receive buffer at the remote receiving end of the respective outgoing link;

token sending means (24, 34; 272, 360, 386, 388, 392, 416, 418) associated with each receive buffer for transmitting a token signal reflecting available buffer space to token indication means at the remote transmitting end of the respective incoming link;

control means (44, 46, 48, 56, 58, 64, 70, 72, 74, 76; 252, 254, 260, 262, 264, 302, 304, 306, 308, 320, 322, 324, 338, 340, 346, 372, 374, 376) for polling receive buffers to preselect a receive buffer containing a data block to be transferred, forwarding a data block destination address from the preselected receive buffer, preselecting and testing the appropriate output circuitry of the outgoing link associated with said destination address, and generating a positive response signal when said preselected output circuitry can accept a data block from the preselected receive buffer; and transfer circuitry (32, 40, 50, 52, 54, 62, 68; 250, 284, 296, 344, 352, 366, 368) responsive to said control means and said positive response signal for transferring a data block from the preselected receive buffer to the preselected output circuitry (FIG. 6; FIGS. 11, 12, 13, 14, 16).

8. Block switching arrangement according to claim 7, characterized in that said transfer circuitry can transfer a data block from a first preselected receive buffer to a first preselected output circuitry independently while said control means operate to preselect by polling a second receive buffer, and to preselect and test appropriate second output circuitry for preparing the next data transfer.

* * * * *